United States Patent Office 3,264,269
Patented August 2, 1966

3,264,269
PROCESS FOR CROSS-LINKING POLYMERS CONTAINING CARBOXYL GROUPS WHICH COMPRISES IMBIBING A SHAPED ARTICLE OF THE POLYMER IN A DIISOCYANATE
Richard Watkin Rees, Graylyn Crest, Del., assignor to E. I. du Pont de Nemours and Company, Wilmington, Del.
No Drawing. Filed Aug. 3, 1962, Ser. No. 214,480
13 Claims. (Cl. 260—77.5)

This invention relates to new and useful polymeric compositions and the process of making such compositions. More particularly this invention relates to cross-linked addition polymers comprising at least 50 mole percent of an α-olefin and from 0.1 to 25 mole percent of an α,β-unsaturated carboxylic acid which has been cross-linked with an unhindered diisocyanate.

Addition polymers of α-olefins often suffer from environmental stress-cracking and low resistance to deformation at elevated temperatures.

It is an object of this invention to form an addition polymer which is highly resistant to environmental stress-cracking. It is a further object of this invention to improve the high temperature deformation resistance of α-olefins-α,β-unsaturated carboxylic acid copolymers. Another object is to provide a method of cross-linking an addition polymer in the presence of antioxidants.

These and other objects are accomplished by reacting a diisocyanate with the carboxylic acid groups on the copolymer to effect cross-linking.

The cross-linked polymers of this invention have the advantage that antioxidants and many other additives can be incorporated in the polymer prior to cross-linking, and retain their effectiveness in the final products. In contrast, antioxidants in polymers which are subjected to peroxide or irradiation cross-linking are attacked by the free radicals formed by the reaction and therefore are not effective in protecting the final product from oxidative degradation. Cross-linked polymers cannot readily be fabricated into shaped articles. With the cross-linking method of this invention a shaped article can be formed from the uncross-linked polymer, and the polymer of which such article is formed can then be cross-linked by treating, i.e., imbibing the article with a diisocyanate.

The polymers used in this invention are addition copolymers of an α-olefin and an α,β-ethylenically unsaturated carboxylic acid having from 3–8 carbon atoms. This includes monocarboxylic, dicarboxylic acids and half esters, amides, and nitriles of dicarboxylic acids.

The preferred α,β-unsaturated acids used have at least one free acid group and the structure $$R_1 = C \begin{matrix} R_2 \\ | \\ COOH \end{matrix}$$

wherein R₁=is selected from the group consisting of

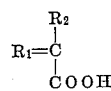

and

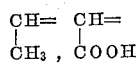

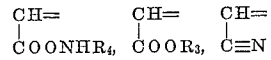

and —R₂ is selected from the group consisting of —H, —CH₃, —C₂H₅, —CONHR₄, —COOR₃, —C≡N, —CH₂COOH, —CH₂CONHR₄, and —CH₂—C≡N, wherein —R₃ is an alkyl containing from 1 to 10 carbon atoms and —R₄ is —R₃, or —H. These α,β-unsaturated acids include acrylic acid, methacrylic acid, ethacrylic acid, itaconic acid, maleic acid, fumaric acid, monoesters of said dicarboxylic acids, such as methyl hydrogen maleate, methyl hydrogen fumarate, and ethyl hydrogen fumarate, half amides such as β-carboxy acrylamide and half nitriles, β-cyano acrylic acid. The proportion of α,β-unsaturated carboxylic or dicarboxylic acid may range from 0.1 mole percent to 25 mole percent of monomer in the total polymer composition. However, it is preferred that the polymer contains from 2 to 10 mole percent α,β-unsaturated carboxylic or dicarboxylic acid monomer based on the total monomer contained in the copolymer.

The copolymer base need not necessarily comprise a two component polymer. Thus, although the olefin content of the copolymer should be at least 50 mole percent, more than one olefin can be employed to provide the hydrocarbon nature of the copolymer base. Additionally, any third copolymerizable monomer can be employed in combination with the olefin and the carboxylic acid comonomer. The scope of base copolymers usitable for use in the present invention is illustrated by the following examples: ethylene/acrylic acid copolymers, ethylene/methacrylic acid copolymers, ethylene/itaconic acid copolymers, ethylene/methyl hydrogen maleate copolymers, ethylene/maleic acid copolymers, ethylene/acrylic acid/methyl methacrylate copolymers, ethylene/methacrylic acid/ethyl acrylate copolymers, ethylene/itaconic acid/methyl methacrylate copolymers, ethylene/methyl hydrogen maleate/ethyl acrylate copolymers, ethylene/methacrylic acid/vinyl acetate copolymers, ethylene/acrylic acid/vinyl alcohol/copolymers, ethylene/propyleneacrylic acid copolymers, ethylene/styrene/acrylic acid copolymers, ethylene/methacrylic acid/acrylonitrile copolymers, ethylene/fumaric acid/vinyl methyl ether copolymers, and ethylene/vinylidene chloride/acrylic acid copolymers.

Preferred three component copolymers are those which contain at least 50 mole percent α-olefin having from 2 to 10 carbon atoms, from 2 to 10 mole percent α,β-unsaturated carboxylic acid, and up to 48 mole percent of a monomer copolymerizable therewith which monomer contains no groups which will react with the diisocyanate nor interfere with the cross-linking reaction. Suitable third monomers for use in three component copolymers are preferably vinyl alcohol, vinyl acetate, and monomers having the structure

wherein —R₅ is selected from the group consisting of —H, —CH₃, and —Cl, and —R₆ is selected from the group consisting of —$R_5$, phenyl, —C≡N, —$OR_7$, and —$COOR_7$ wherein —$R_7$ is an alkyl radical having up to 10 carbon atoms.

Copolymers of α-olefins and an α,β-unsaturated carboxylic or dicarboxylic acid suitable for use in this invention can be prepared in accordance with any one of U.S. Patent 2,378,629, issued June 19, 1945, to Hanford; U.S. Patent 2,396,920, issued March 19, 1946, to Larson; or U.S. Patent 2,396,677, issued March 19, 1946, to Brubaker; the disclosures of which are hereby incorporated by reference. Each of these patents discloses the direct production of copolymers which results in the formation of random copolymers. That is, the various monomer units are randomly distributed along the polymer chain.

Copolymers of α-olefins with carboxylic acids may be prepared by copolymerization of the α-olefin with an α,β-ethylenically unsaturated carboxylic acid derivative which subsequently or during copolymerization is reacted either completely or in part to form the free acid. Thus hydrolysis, saponification, or pyrolysis may be employed to form an acid copolymer from an ester copolymer. The molecular weight of the copolymers useful as base resins is most suitably defined by melt index a measure of melt viscosity. The melt indexes referred to throughout this specification were obtained in accordance with ASTM–D–1238–57T. The melt index of copolymers employed in the formation of ionic copolymers which are useful as plastics is preferably in the range of 0.1 to 100 g./10 min. and, more particularly, in the range of 1.0 to 20 g./10 min.

Suitable diisocyanates for use in this invention are those which contain up to twenty carbon atoms and are capable of reacting with a carboxylic acid. Therefore, any diisocyanate of up to twenty carbon atoms may be used except those in which the isocyanate group is sterically hindered from reaction or in which a highly reactive group in the diisocyanate molecule interferes with the reaction of such diisocyanate with a carboxylic acid.

Preferred diisocyanates for use in this invention have the structure, O=C=N—$R_8$—N=C=O, wherein $R_8$ is selected from the group consisting of alkyl chains having from 1 to 10 carbon atoms in the chain in which one alpha carbon atom has the structure

wherein —$R_9$ is selected from the group consisting of —H, alkyl chains having up to 10 carbon atoms and the phenyl radical, all remaining carbons being in the form of —$CH_2$; aryl radicals, cycloalkanes, diphenyl methane, bis-phenyl radicals, dicyclohexane, and biscyclohexyl methane. The corresponding thio-diisocyanates are also operable but not preferred due to their intense aroma.

Such diisocyanates include bis-para(isocyanophenyl) methane, better known as 4,4'-methylene-bis-phenyl isocyanate,

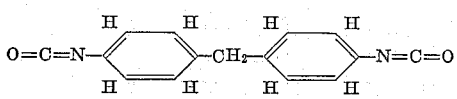

toluene diisocyanate, m-phenylene diisocyanate, and 1,3-propane diisocyanate and 1,6-hexamethylene diisocyanate.

The chemical cross-linking of this invention takes place readily and is easily controlled by means of any one of or a combination of time, temperature, and amount of diisocyanate used. This ease of cross-linking control is in contrast to the usual free radical cross-linking which is difficult to control. The chemical reaction is as follows:

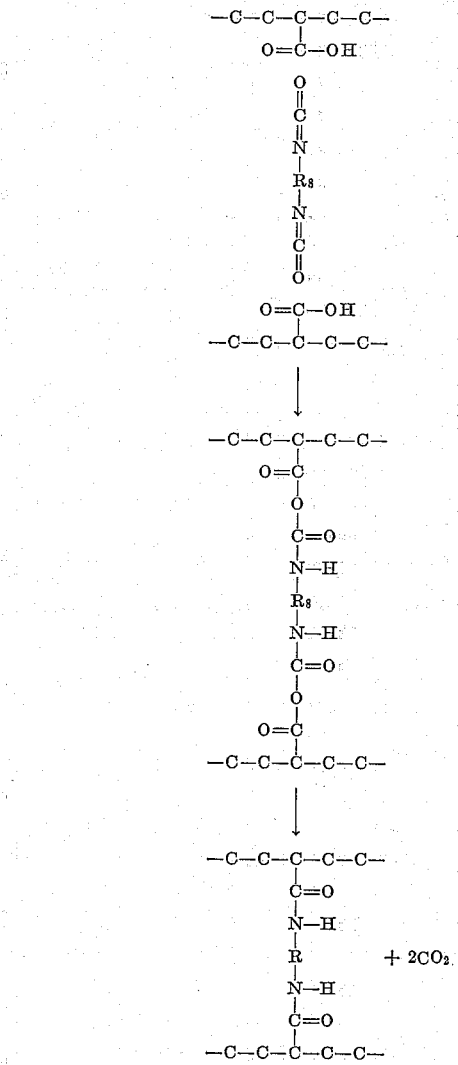

This cross-linking reaction can be carried out by surface treatment below the melt temperature. The cross-linking reaction may be carried out at temperatures above 25° C.

The corresponding reaction between monomeric carboxylic acids and isocyanates is known in the art. However, such reaction is not vigorous and it is therefore quite surprising that it can be carried out on polymer-attached carboxylic acid groups with the relative ease experienced in carrying out such reaction in the performance of this invention.

The following examples are illustrative of the invention:

EXAMPLE I

Four grams of a copolymer of ethylene and methacrylic acid, containing 7.2 mole percent methacrylic acid and 92.8 mole percent ethylene and having a melt index of 25, was dissolved in 12 cc. of xylene. This solution was heated to 100° C. and 2 g. of toluene diisocyanate were added. The solution was maintained at 100° C. for 1 hour during which time the solution had gelled. The product was recovered by precipitation with methanol. The product had a melt index of 0.084, showing that cross-linking had occurred.

In Examples 3–42 films of the ethylene- α,β-unsaturated carboxylic acid were prepared by compression molding. These films were 10 mils thick and were cut into a sample 6" by 6" which was then placed in a beaker containing 500 cc. of the undiluted cross-linking diisocyanate, at the temperature and for the time indicated for each example.

Table I

| Ex. | Resin α,β-unsaturated carboxylic acid and mole percent thereof | Resin Other monomers in resin and mole percent thereof | Initial Melt Index of Resin | Isocyanate Used | Cross-linking Conditions Temperature, °C. | Cross-linking Conditions Time, seconds | Cross-linking Conditions Melt Index of Cross-linked Resin |
|---|---|---|---|---|---|---|---|
| 3 | 6% Itaconic acid | 94% Ethylene | 9.0 | m-Phenylene diisocyanate | 80 | 300 | 0 |
| 4 | do | do | 9.0 | Toluene diisocyanate | 80 | 300 | 0.014 |
| 5 | 3.6% Fumaric acid | 96.4% Ethylene | 7.8 | m-Phenylene diisocyanate | 80 | 300 | 0.16 |
| 6 | do | do | 7.8 | Toluene diisocyanate | 80 | 200 | 3.30 |
| 7 | 10% Methacrylic acid | 20% Vinyl acetate, 70% Ethylene | 9.0 | m-Phenylene diisocyanate | 80 | 300 | 0 |
| 8 | do | do | 9.0 | Toluene diisocyanate | 80 | 300 | 0 |
| 9 | 5% Methacrylic acid | 95% Ethylene | 6.7 | m-Phenylene diisocyanate | 80 | 300 | 0 |
| 10 | do | do | 6.7 | Toluene diisocyanate | 80 | 300 | 0 |
| 11 | 18% Methacrylic acid | 82% Ethylene | 6.3 | m-Phenylene diisocyanate | 80 | 300 | 0.085 |
| 12 | do | do | 6.3 | Toluene diisocyanate | 80 | 300 | 0 |
| 13 | 10% Methacrylic acid | 90% Ethylene | 5.8 | 4,4'methylene-bis-phenylisocyanate | 80 | 10 | 5.02 |
| 14 | do | do | 5.8 | do | 80 | 60 | 3.2 |
| 15 | do | do | 5.8 | do | 80 | 300 | 0.04 |
| 16 | do | do | 5.8 | m-Phenylene diisocyanate | 80 | 10 | 0.64 |
| 17 | do | do | 5.8 | do | 80 | 60 | 0 |
| 18 | do | do | 5.8 | do | 80 | 300 | 0 |
| 19 | do | do | 5.8 | Dichlorotoluene diisocyanate | 80 | 10 | 5.3 |
| 20 | do | do | 5.8 | do | 80 | 60 | 0.84 |
| 21 | do | do | 5.8 | do | 80 | 300 | 0 |
| 22 | do | do | 5.8 | Hexamethylene diisocyanate | 80 | 10 | 0.37 |
| 23 | do | do | 5.8 | do | 80 | 60 | 0 |
| 24 | do | do | 5.8 | do | 80 | 300 | 0 |
| 25 | do | do | 5.8 | Toluene diisocyanate | 25 | 600 | 0.94 |
| 26 | do | do | 5.8 | do | 50 | 60 | 0.007 |
| 27 | do | do | 5.8 | do | 60 | 60 | 0 |
| 28 | do | do | 5.8 | do | 60 | 30 | 0.007 |
| 29 | do | do | 5.8 | do | 60 | 15 | 0.015 |
| 30 | do | do | 5.8 | do | 65 | 15 | 0.010 |
| 31 | do | do | 5.8 | do | 70 | 60 | 0 |
| 32 | do | do | 5.8 | do | 70 | 15 | 0.0015 |
| 33 | do | do | 5.8 | do | 80 | 60 | 0 |
| 34 | do | do | 5.8 | do | 80 | 10 | 0.0033 |
| 35 | do | do | 5.8 | do | 80 | 15 | 0.0032 |
| 36 | do | 50% Ethylene, 40% Propylene | | m-m-Biphenyl diisocyanate | 80 | 300 | 0.00 |
| 37 | do | 85% Ethylene, 5% Vinylidene chloride | | Bis,4-cyclohexylmethane diisocyanate | 100 | 300 | 0.00 |
| 38 | do | 80% Ethylene, 10% Vinyl alcohol | | α-Methyl-hexamethylene diisocyanate | 80 | 300 | 0.001 |
| 39 | 8% Methacrylic acid | 77% Ethylene, 15% Styrene | | 1,3 propane diisocyanate | 80 | 300 | 0.02 |
| 40 | 20% Itaconic acid | 70% Ethylene, 10% Acrylonitrile | | α-Octyl-hexamethylene diisocyanate | 80 | 300 | 0.00 |
| 41 | 7% Fumaric acid | 63% Ethylene, 30% decene | | 1,4 butyl thio-diisocyanate | 100 | 300 | 0.001 |
| 42 | 1% Methacrylic acid | 84% Ethylene, 15% Vinyl propionate | | 1,4 cyclohexane diisocyanate | 80 | 300 | 0.00 |

The stress crack resistance of the cross-linked compositions of this invention was tested in a solution of alkyl aryl polyethylene glycol in butanol and water at 50° C. in accordance with A.S.T.M. D-1693-60T. In this test standard Bell Telephone Laboratory's notched samples were used. In the first test the notched samples were made of a copolymer containing 10 mole percent methacrylic acid and 90 mole percent ethylene which had a melt index of 5.8. Ten of these samples were cross-linked in a bath of toluene diisocyanate by heating the bath at 110° C. for 15 minutes. The ten cross-linked samples and ten non-cross-linked samples were then conditioned at 100° C. for 24 hours. The samples were then tested as above described. All of the non-cross-linked samples failed within 24 hours. None of the cross-linked samples had failed after 800 hours in the test. Some more of the same notched test samples used above were cross-linked with m-phenylene diisocyanate at 80° C. for 15 minutes. These samples were then conditioned at 70° C. for 7 days, along with ten non-cross-linked control examples. The cross-linked samples all withstood 200 hours of the above-described stress-crack resistance test without a failure while 5 out of 10 of the control samples failed within 15 minutes. By comparison a sample of a conventional free radical polyethylene having an initial melt index of 3.70 which had been peroxide treated to yield a cross-linked polymer having a melt index of 1.40 withstood only 1½ hours before 50% of the samples failed in the above-described stress-crack resistance test. Another sample of a conventional free radical polyethylene having a melt index of 2.20 was peroxide treated to yield a cross-linked polymer having a melt index of 1.82 which withstood 216 hours in the above-described stress-crack resistance test before 50 percent of the samples failed.

This invention is particularly useful in cross-linking the surface of articles formed from α-olefin/α,β-unsaturated carboxylic acid copolymers. In particular wire jackets may be treated in accordance with this invention whereby their stress-crack resistance, and heat distortion resistance may be greatly increased. Example 43 is illustrative of cross-linking the surface of the coating on wire.

*Example 43.*—One hundred feet of No. 22 copper wire was coated with 15 mils of a copolymer of 10 mole percent methyl methacrylate and 90 mole percent ethylene in a conventional cross head wire coating apparatus. The thus coated wire was passed through a bath of toluene diisocyanate maintained at 90° C. The period of residence of each portion of wire in the toluene diisocyanate bath was 60 seconds.

I claim:

1. A process of cross-linking a shaped article formed of a random addition copolymer consisting essentially of from 0.1 to 25 mole percent of an α,β-unsaturated carboxylic acid of the structure

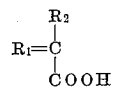

wherein $R_1=$ is selected from the group consisting of

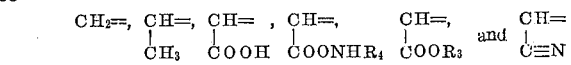

and —$R_2$ is selected from the group consisting of —H, —$CH_3$, —$C_2H_5$, —$CONHR_4$, —$COOR_3$, —$C\equiv N$, —$CH_2COOH$, —$CH_2CONHR_4$, and —$CH_2C\equiv N$, wherein —$R_3$ is an alkyl containing from 1 to 10 carbon atoms, and —$R_4$ is selected from the group consisting of —$R_3$ and —H; at least 50 mole percent of an α-olefin containing from 2 to 10 carbon atoms; and the remainder of the copolymer being formed of vinyl acetate, and monomers having the structure $$CH_2=\underset{R_5}{\overset{R_6}{C}}$$

wherein —$R_5$ is selected from the group consisting of —H, —$CH_3$, and —Cl, and —$R_6$ is selected from the group consisting of —$R_5$, phenyl, —C≡N, —$OR_7$, and —$COOR_7$, wherein —$R_7$ is an alkyl radical having up to 10 carbon atoms; which comprises the step of imbibing said shaped article with a diisocyanate free of steric hindrance, and containing up to 20 carbon atoms, at a temperature of from 25° C. to the melt temperature of the copolymer whereby the copolymer is cross-linked and the shaped article retains substantially its original shape.

2. A process of cross-linking a shaped article formed of a random addition copolymer consisting essentially of from 0.1 to 25 mole precent of an α,β-unsaturated carboxylic acid of the structure $$R_1=\underset{COOH}{\overset{R_2}{C}}$$

wherein $R_1$= is selected from the group consisting of $$\underset{CH_3}{\overset{CH=}{|}}, \underset{COOH}{\overset{CH=}{|}}, \underset{COONHR_4}{\overset{CH=}{|}}, \underset{COOR_3}{\overset{CH=}{|}} \text{ and } \underset{C≡N}{\overset{CH=}{|}}$$

and —$R_2$ is selected from the group consisting of —H, —$CH_3$, —$C_2H_5$, —$CONHR_4$, —$COOR_3$, —C≡N, —$CH_2COOH$, —$CH_2CONHR_4$, and —$CH_2C≡N$, wherein —$R_3$ is an alkyl containing from 1 to 10 carbon atoms, and —$R_4$ is selected from the group consisting of —$R_3$ and —H; at least 50 mole percent of an α-olefin containing from 2 to 10 carbon atoms; and the remainder of the copolymer being formed of vinyl acetate, and monomers having the structure $$CH_2=\underset{R_5}{\overset{R_6}{C}}$$

wherein —$R_5$ is selected from the group consisting of —H, —$CH_3$, —Cl, and —$R_6$ is selected from the group consisting of —$R_5$, phenyl, —C≡N, —$OR_7$, and —$COOR_7$, wherein —$R_7$ is an alkyl radical having up to 10 carbon atoms; which comprises the step of imbibing said shaped article with a diisocyanate having the structure O=C=N—$R_8$—N=C=O, wherein —$R_8$— is selected from the group consisting of alkyl chains having from 1 to 10 carbon atoms in the chain in which one alpha carbon atom has the structure $$-\underset{|}{\overset{R_9}{C}}H-$$

wherein —$R_9$ is selected from the group consisting of —H, alkyl chains having up to 10 carbon atoms, and the phenyl radical, all remaining carbons being in the form of $CH_2$; aryl radicals; cycloalkanes; diphenyl methane; bis-phenyl radicals; dicyclohexane; and biscyclohexyl methane; at a temperature of from 25° C. to the melt temperature of copolymer whereby the copolymer is cross-linked and the shaped article retains substantially its original shape.

3. The process of claim 2 wherein $R_1$ is $CH_2$=.

4. The process of claim 3 wherein the α-olefin is ethylene.

5. A process of cross-linking a shaped article formed of a random addition copolymer consisting essentially of from 0.1 to 25 mole percent of methacrylic acid and the remainder ethylene, which comprises the step of imbibing said shaped article with a diisocyanate having the structure O=C=N—$R_8$—N=C=O, wherein —$R_8$— is selected from the group consisting of alkyl chains having from 1 to 10 carbon atoms in the chain in which one alpha-carbon atom has structure $$-\underset{|}{\overset{R_9}{C}}H-$$

wherein —$R_9$ is selected from the group consisting of —H, alkyl chains having up to 10 carbon atoms and the phenyl radical, all remaining carbons being in the form of $CH_2$; aryl radicals; cycloalkanes; diphenyl methane; bis-phenyl radicals; dicyclohexane; and biscyclohexane; at a temperature of from 25° C. to the melt temperature of the copolymer whereby the copolymer is cross-linked and the shaped article retains substantially its original shape.

6. A process of cross-linking a shaped article formed of a random addition copolymer consisting essentially of from 0.1 to 25 mole percent acrylic acid and the remainder ethylene, which comprises the step of imbibing said shaped article with a diisocyanate having the structure O=C=N—$R_8$—N=C=O, wherein —$R_8$— is selected from the group consisting of alkyl chains having from 1 to 10 carbon atoms in the chain in which one alpha-carbon atom has the structure $$-\underset{|}{\overset{R_9}{C}}H-$$

wherein —$R_9$ is selected from the group consisting of —H, alkyl chains having up to 10 carbon atoms, and the phenyl radical, all remaining carbons being in the form of $CH_2$; aryl radicals; cycloalkanes; diphenyl methane; bisphenyl radicals; dicyclohexane; and biscyclohexane; at a temperature of from 25° C. to the melt temperature of the copolymer whereby the copolymer is cross-linked and the shaped article retains substantially its original shape.

7. A process of cross-linking a shaped article formed of a random addition copolymer consisting essentially of from 0.1 to 25 mole percent of methacrylic acid, at least 50 mole percent ethylene, and the remainder vinyl acetate, which comprises the step of imbibing said shaped article with a diisocyanate having the structure O=C=N—$R_8$—N=C=O, wherein —$R_8$— is selected from the group consisting of alkyl chains having from 1 to 10 carbon atoms in the chain in which one alpha-carbon atom has the structure $$-\underset{|}{\overset{R_9}{C}}H-$$

wherein —$R_9$ is selected from the group consisting of —H, alkyl chain having up to 10 carbons, and the phenyl radical, all remaining carbons being in the form of $CH_2$; aryl radicals; cycloalkanes; diphenyl methane; at a temperature of from 25° C. to the melt temperature of the copolymer whereby the copolymer is cross-linked and the shaped article retains substantially its original shape.

8. A process of cross-linking a shaped article formed of a random addition copolymer consisting essentially of from 0.1 to 25 mole percent of methacrylic acid, at least 50 mole percent ethylene, and the remainder methyl methacrylate, which comprises the step of imbibing said shaped article with a diisocyanate having the structure O=C=N—$R_8$—N=C=O, wherein —$R_8$— is selected from the group consisting of alkyl chains having from 1 to 10 carbon atoms in the chain in which one alpha-carbon atom has the structure $$-\underset{|}{\overset{R_9}{C}}H-$$

wherein —$R_9$ is selected from the group consisting of —H, alkyl chains having up to 10 carbon atoms and the phenyl radical, all remaining carbons being in the form of $CH_2$; aryl radicals; cycloalkanes; diphenyl methane; bisphenyl radicals; dicyclohexane; and biscyclohexane; at a temperature of from 25° C. to the melt temperature of the copolymer whereby the copolymer is cross-linked and the shaped article retains substantially its original shape.

9. A process of cross-linking a shaped article formed of a random addition copolymer consisting essentially of from 0.1 to 25 mole percent of acrylic acid, at least 50 mole percent ethylene, and the remainder ethyl acrylate, which comprises the step of imbibing said shaped article with a diisocyanate having the structure $$O=C=N-R_8-N=C=O$$

wherein —$R_8$— is selected from the group consisting of alkyl chains having from 1 to 10 carbon atoms in the chain in which one alpha-carbon atom has the structure $$-\overset{R_9}{\underset{}{C}}H-$$

wherein —$R_9$ is selected from the group consisting of —H, alkyl chains having up to 10 carbon atoms and the phenyl radical, all remaining carbons being in the form of $CH_2$; aryl radical; cycloalkanes; diphenyl methane; bisphenyl radicals; dicyclohexane; and biscyclohexane; at a temperature of from 25° C. to the melt temperature of the copolymer whereby the copolymer is cross-linked and the shaped article retains substantially its original shape.

10. The process of claim 1 wherein the shaped article is a film.

11. The process of claim 1 wherein the shaped article is a wire jacket.

12. The process of claim 6 wherein the shaped article is a film.

13. The process of claim 6 wherein the shaped article is a wire jacket.

References Cited by the Examiner

UNITED STATES PATENTS

| 2,845,413 | 7/1858 | Goodrich et al. | 260—94.9 |
| 2,920,067 | 1/1960 | Mortimer | 260—88.1 |
| 2,929,800 | 3/1960 | Hill | 260—77.5 |
| 3,071,565 | 1/1963 | Davis et al. | 260—88.1 |

FOREIGN PATENTS

| 1,255,077 | 1/1961 | France. |

JOSEPH L. SCHOFER, *Primary Examiner.*

JOSEPH R. LIBERMAN, *Examiner.*

W. HOOVER, W. G. GOODSON, *Assistant Examiners.*